(No Model.) 3 Sheets—Sheet 1.
A. PUNTENEY & E. C. SOOY.
COMBINED HAY RAKE AND LOADER.
No. 487,640. Patented Dec. 6, 1892.
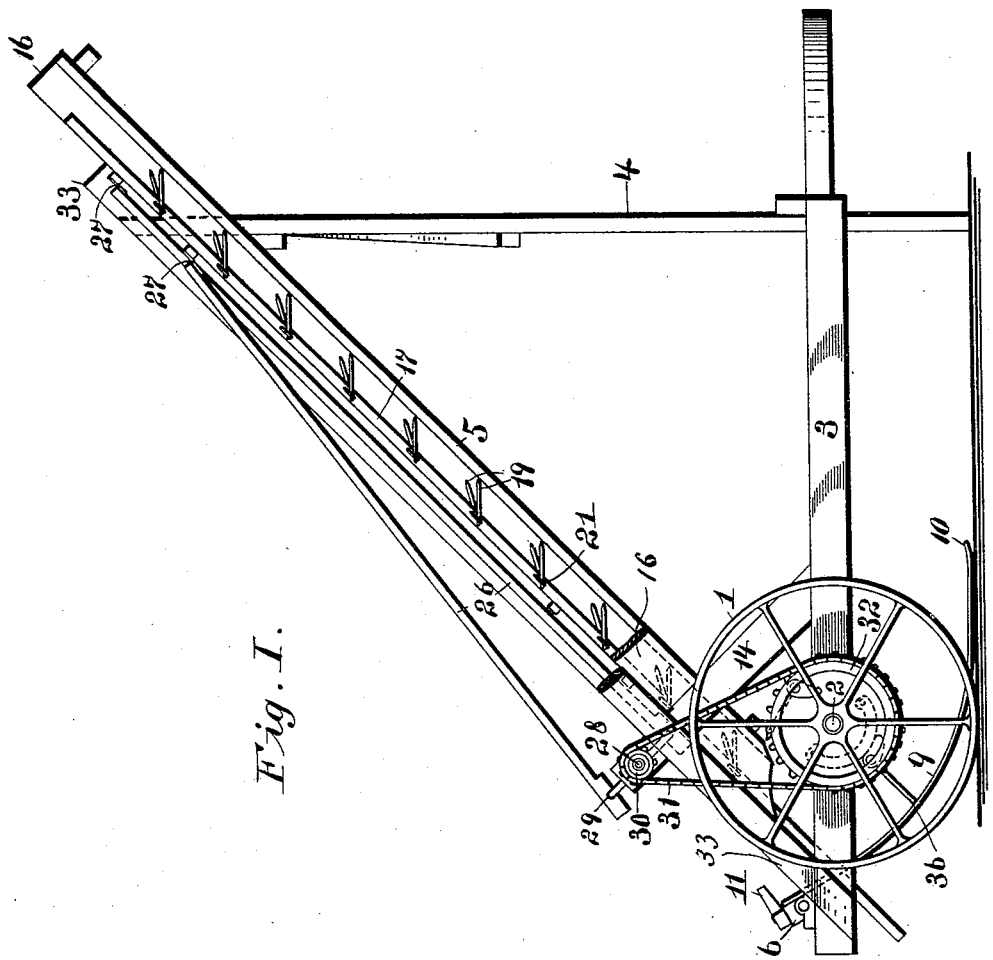
Fig. I.
Witnesses:
F. G. Fischer
George E. Cross
Inventors:
A. Punteney
E. C. Sooy
By Knight Bros.
Attys.

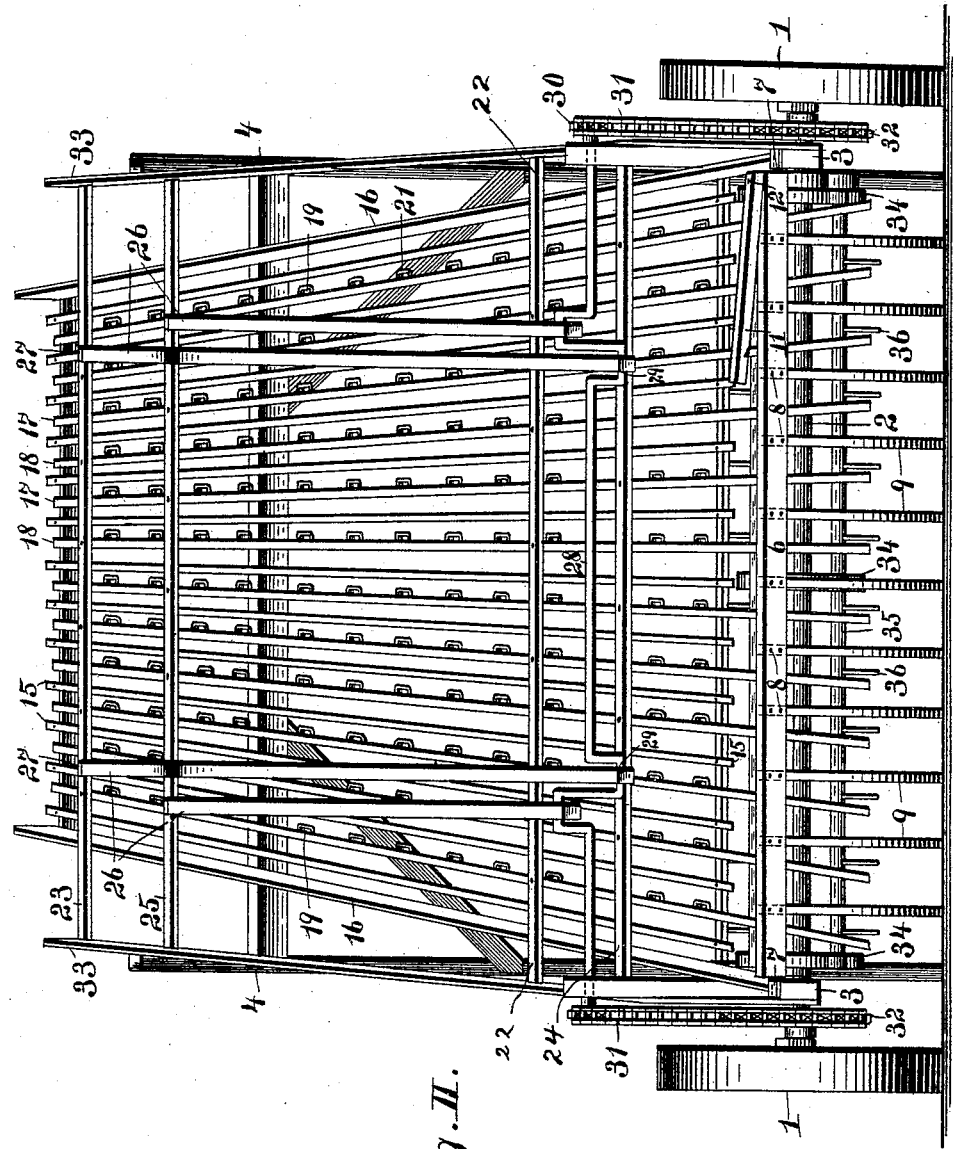

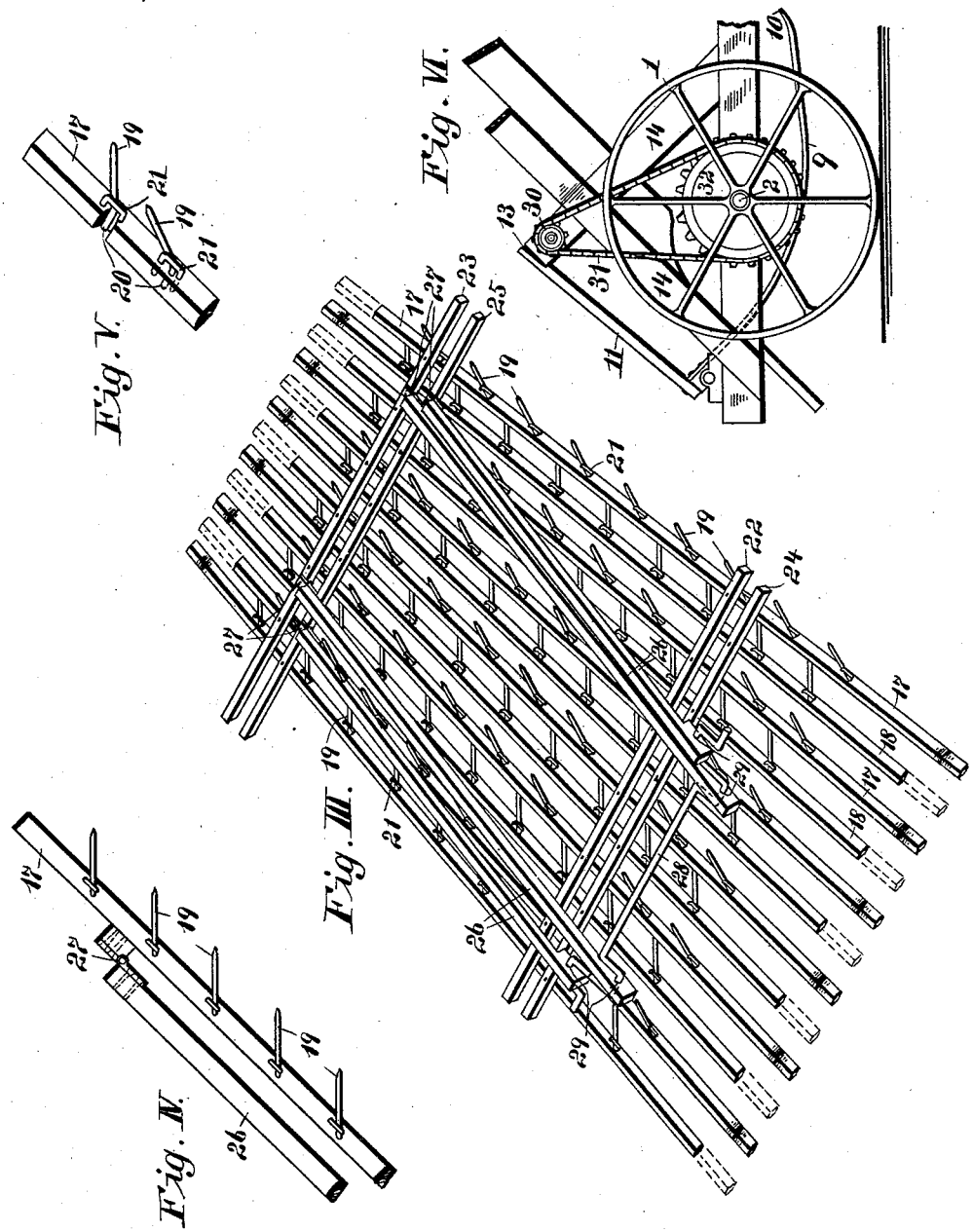

UNITED STATES PATENT OFFICE.

ARCHIBALD PUNTENEY AND EPHRAIM C. SOOY, OF KANSAS CITY, MISSOURI.

COMBINED HAY RAKE AND LOADER.

SPECIFICATION forming part of Letters Patent No. 487,640, dated December 6, 1892.

Application filed December 23, 1891. Serial No. 415,997. (No model.)

*To all whom it may concern:*

Be it known that we, ARCHIBALD PUNTENEY and EPHRAIM C. SOOY, both of Kansas City, in the county of Jackson and State of Missouri, have invented certain new and useful Improvements in a Combined Hay Rake and Loader, of which the following is a full, clear, and exact description, reference being had to the accompanying drawings, which form a part of this specification.

Our invention relates to a certain new and useful device for raking up hay, straw, and the like and loading it onto a vehicle; and our invention consists in certain features of novelty hereinafter described, and pointed out in the claims.

Figure I represents a side elevation of our improved device, with a portion of the frame broken away to disclose the oscillating slats and teeth. Fig. II is a rear elevation of the same. Fig. III is a detail perspective of the oscillating slats and teeth for conveying the material upward and discharging it onto a vehicle. Fig. IV is a detail view of one of the oscillating slats, showing the manner of connecting the arm for operating the same. Fig. V is an enlarged detail perspective showing the manner of securing the teeth to the oscillating slats. Fig. VI is an enlarged detail side view showing means for raising the rake-teeth from the ground and holding them in said position.

Referring to the drawings, 1 represents the ground-wheels on which our device travels and which drive the mechanism for carrying the hay upward. The wheels 1 are connected by an axle 2.

3 represents a horizontal frame connected with the axle 2 and extending both forward and to the rear of the same, and 4 represents a vertical frame connected with the frame 3 and extended up to and supporting the forward end of the inclined table 5, over which the hay is forced in its passage from the ground to the vehicle.

6 represents a bar pivoted, as shown at 7, to the frame 3, which permits of the bar having a rocking movement. To the bar 6 is secured, as shown at 8, a number of teeth 9. These teeth are flattened on their upper and lower sides and extend in a curved line from the bar 6 forward of the wheel 1, resting on the ground with their points slightly upturned, as shown at 10. These teeth extend sufficiently far forward so that the weight of the hay on the same will not bend the teeth backward out of line; but the pressure will force the teeth against the ground, and the ground will thus obviate the strain upon the teeth, and as they are bent upward at their upper ends and extend forward, as described, they will on striking an obstacle rise vertically and ride over the same instead of springing backward, as in an ordinary style of tooth, where the teeth do not extend so far forward.

11 represents a lever pivoted to the bar 6 at 12, by which said bar can be rocked backward and throw the teeth 9 upward, as shown in Fig. VI, out of contact with the ground or material when it is not desired to have the rake in operation. The teeth are held in this position by moving the lever 11 from the position shown in Figs. I and II to the position shown in Fig. VI, with the upper end of the same resting against the frame, as shown at 13.

The inclined table 5 is supported at its rear end by an auxiliary frame 14, secured to the frame 3. This table is formed of a series of slats 15 for the hay to ride upon, and with side-boards 16 to prevent the material from falling off at either side.

17 18 represent a series of oscillating slats having teeth 19 secured thereto for forwarding the material on the inclined table. The teeth 19 are provided with right-angle extensions 20, which extend into holes formed in the slats 17 18 and are held therein by staples 21, driven into the slats at either side of the tooth, said staples being elongated, permitting the tooth to rock back and forth in its fastening, (see Fig. V,) the teeth being pressed backward, as shown in the slats marked 18, as that series is conveying the material forward and upward and the adjacent slat having its teeth pressed forward (see lower portion of Fig. V) as that slat travels backward preparatory to forwarding a fresh supply. As the slats travel backward the teeth spring forward, as shown in the lower portion of Fig. V and on the slats marked 17, thus riding over the material, and as the slats reach their lowest limit and start forward again the teeth drop back into the position shown at the upper end of Fig. V and on the slats marked 18, said slats 17 18 working always in the same plane. The slats 17 are connected at their lower ends with the bar 22 and at their upper ends with the bar 23, the slats 18 being connected near their lower ends with the bar 24 and at their upper ends with the bar 25. The bars 23 25 are hinged to the arms 26, as shown at 27, said hinges permitting the rear ends of said arms to rise and fall. The rear ends of said arms are connected to a crank-shaft 28, as shown at 29, for the purpose of oscillating the slats 17 18, to which the bars 23 25 are connected. The crank-shaft 28 is provided with sprocket-wheels 30 at each of its ends, with which mesh drive-chains 31, said drive-chains meshing with sprocket-wheels 32 on the main axle 2.

The ends of cross-bars 22, 23, 24, and 25 slide upon the side-boards 16 of the table, thus guiding and supporting the oscillating slats from the table.

33 represents strips extending in the same direction as the inclined table 5, said strips being secured to the frame and preventing lateral movement of the cross-bars to which the oscillating slats are connected. (See Fig. II.) The strips 33 serve as a lateral guide to the cross-bars.

To the axle 2 is secured a series of disks 34, to which are connected transverse bars 35 for carrying a set of teeth 36, said teeth being for the purpose of taking the hay from the rake-teeth 9 and throwing it onto table 5, from whence it is carried by the oscillating teeth to the point desired. A particular description of the operation of these teeth is given and more extensively described in our patent, No. 456,237, issued on the 21st day of July, 1891, for improvement on hay-loaders.

We claim as our invention—

1. An oscillating carrier for raising material, consisting of a table, oscillating slats, means for moving said slats, teeth 19, having right-angle extensions 20, and elongated staples 21, secured in the sides of the slats and spanning the teeth on each side close to the extensions 20 for holding said teeth in connection with said slats and permitting them to rock back and forth in their bearings, substantially as set forth.

2. The combination of a frame, suitable driving mechanism supporting the frame, rock-bar 6, teeth 9, secured to and extending forward of the driving mechanism, and a lever 11 for rocking said bar, connected at one end to the bar by a pivot 12 at right angles to the bar, said lever being thereby adapted to swing in a plane extending across the machine, whereby its free end may be supported by the frame, and thus hold the teeth in raised position, substantially as set forth.

ARCHIBALD PUNTENEY.
EPHRAIM C. SOOY.

Witnesses:
 JAS. E. KNIGHT,
 FRANCES E. MULLETT.